UNITED STATES PATENT OFFICE.

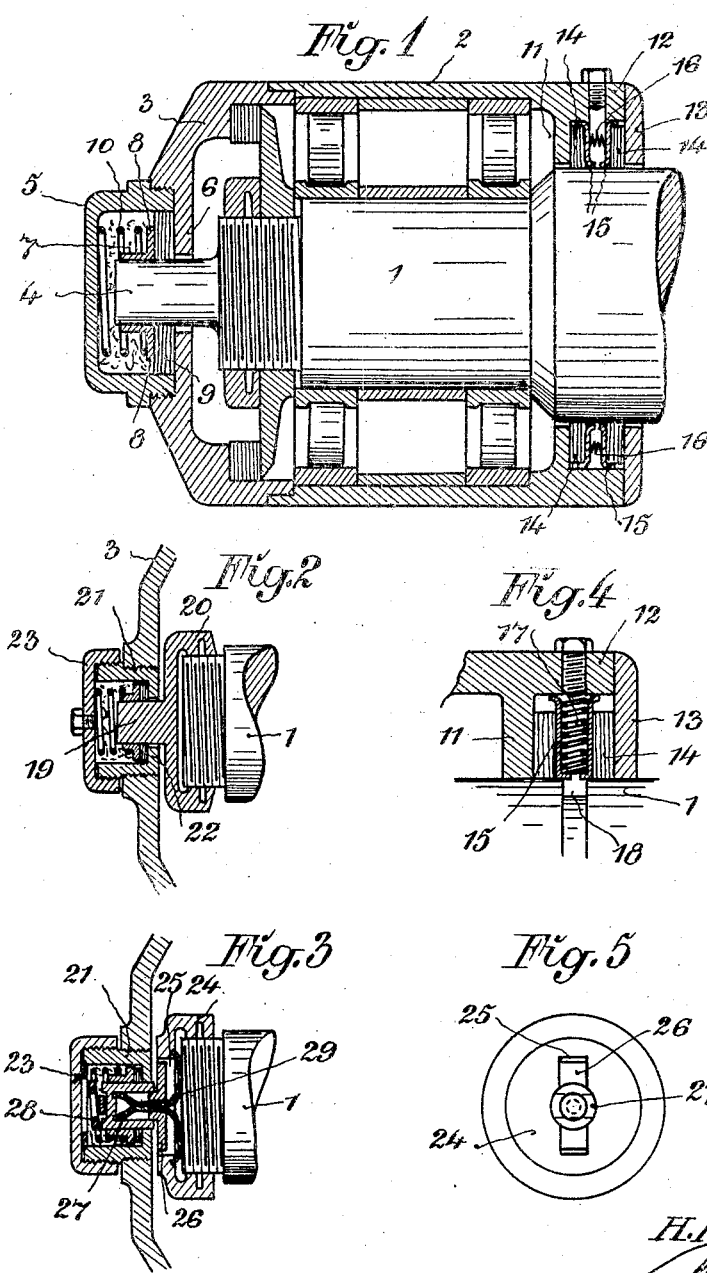

HILDING KNUTSSON ÅNGSTRÖM, OF MALMO, SWEDEN.

ROLLER OR BALL BEARING FOR ELECTRICALLY-DRIVEN VEHICLES AND THE LIKE.

1,406,807. Specification of Letters Patent. Patented Feb. 14, 1922.

Application filed July 2, 1921. Serial No. 482,099.

*To all whom it may concern:*

Be it known that I, HILDING KNUTSSON ÅNGSTRÖM, a citizen of Sweden, and residing at Malmö, in the county of Malmöhus, Kingdom of Sweden, have invented a certain new and useful Improvement in Roller or Ball Bearings for Electrically-Driven Vehicles and the like, of which the following is a specification.

In electrically driven street cars, electric locomotives and the like, when the framing and supporting wheels of the vehicle are used for partially carrying the electric current used in the motors from an insulated feeder to the earth, it is a well known fact that the bearings for the wheels are liable to serious damages because of the current transmitted between the bearing surfaces, this being especially the case when antifriction bearings, such as roller or ball bearings, are used, the useful working of which is largely depending upon minutely polished and bright bearing surfaces.

To prevent the arising of such bearing currents it has previously been proposed to insulate the bearing, this being, however, costly and impractical, since the insulating material has to take up all the stresses arising in the bearing proper and is liable to dry and harden &c, so that cracks and other damages easily will arise therein, whereafter its insulating properties are diminished or lost.

According to my present invention the difficulties are intended to be done away with in a different way i. e. by shunting off the current from the bearing surfaces by means of a non-rotating, ring-shaped contact member, termed below "the fixed contact member" and a rotating contact member affixed to the shaft, both of said contact members being in constant contact with a powderous or liquid electric conductor, such as graphite powder or mercury.

Some embodiments of my invention are shown in the accompanying drawing, in which Fig. 1 shows a journal box provided with means for shunting off the current and seen in longitudinal section. Figs. 2 and 3 show two different modifications of the outer end of the same and Fig. 4 shows a modification of the inner end thereof. Fig. 5 is an end view of the shaft and parts affixed thereto corresponding to Fig. 3.

All of the modifications shown in the drawing have a fixed contact member arranged within the journal box itself or a housing attached thereto and a rotating contact member which is the shaft itself or a cylindrical member attached thereto. In all of the modifications both of said contact members are in constant contact with the liquid or powderous conductor.

In Fig. 1 two different modifications are shown, viz. at the outer and inner end of the journal box, and in both of them the rotating contact member is formed by the shaft itself.

In Fig. 1 the reference 1 represents the shaft and 2 the journal box, which is closed by means of a removable cover 3. At the outer end the shaft has a reduced diameter and forms a pin 4, the end of which is located within a housing or cap 5 removably affixed to the box cover 3. Around the inner end of the pin 4 a flange 6, provided on the box cover, forms the inner bottom wall of the cap 5. Around the outer end of the pin 4 a ring-shaped member is loosely mounted, said member having an L-shaped cross section. One branch of said member forms a sleeve 7 surrounding the pin 4 and the other branch forms a flange 8 extending towards the cylindrical cap. The ring 7, 8 is prevented from rotating in one way or the other and usually no special means are needed for this purpose. Between the flanges 6 and 8 a packing ring 9 is arranged for the purpose of closing the interior of the cap 5 from the interior of the bearing proper, so that the liquid or powderous conductor is prevented from intruding into the bearing and the lubricant used in the latter prevented from intruding into the cap. A spring 10 is arranged between the outer wall of the cap 5 and the flange 8, said spring serving for the compression of the packing ring 9 and by friction for braking the ring 7, 8 so that it will have no tendency to rotate.

At the inner end of the box an annular chamber surrounding the shaft is provided the walls of said chamber apart from the shaft itself consisting of a radially extending flange 11, an axially extending collar 12 and a ring-shaped cover 13 closing the inner end of the chamber. At each end of said annular chamber a packing ring 14 is arranged and at the sides of said rings facing each other a metal ring 15 is arranged. At suitable distances around the whole circumference expansion springs 16 are arranged said springs serving the purpose of pressing the rings 15 apart and compressing the packing rings 14. The liquid or powderous conductor is introduced within the cap 5 and also into the annular cavity at the inner end of the box. By means of the arrangements described the journal box is tightly closed, so that dust is prevented from intruding therein. The packing rings 9 and 14 are not necessarily electrically insulating. Their particular duty is to act as a packing for preventing the fluid or powderous electrical conductor from entering the bearing proper, and while such might be more efficient if electrical conductors, the conductivity is not essential.

In the modifications already described and also in the ones to be described below the current from the fixed contact member and the walls of the cavities enclosing the same is transmitted by means of the liquid or powderous electric conductor to the rotating contact member, i. e. to the shaft, from where it is transmitted to the wheels and to the earth without passing through the bearing proper, which thus is shunted off.

In Fig. 4 a modification of the arrangement at the inner end of the journal box is shown and similar references refer to the same particulars described in connection with Fig. 1. Instead of axially arranged springs as described in connection with the latter figure radially arranged springs 17 are arranged between the metal rings 15 according to Fig. 4 and for the purpose of obtaining a larger chamber for the liquid or powderous electric conductor a groove 18 is turned in the shaft opposite to the space between the rings 15, but otherwise the construction is similar to Fig. 1. When compressing the springs 17, which may be done by means of screws 19, they tend to increase in diameter and thereby they force the rings 15 apart, but simultaneously they exert a radial pressure and press the rings, which may be split, up against the shaft.

According to Fig. 2 the arrangement with regard to the outer end of the box is somewhat similar to Fig. 1, but the rotating contact member is not in one piece with the shaft. On the contrary it is detachably connected therewith and consists of a pin 19 the inner end of which is given the form of a capsular nut 20 screwed upon the threaded end of the shaft 1. In a central hole within the box cover 3 there is arranged a sleeve 21, the inner end of which is provided with an inwardly extending flange 22, corresponding to the flange 6 described above. The outer end of said sleeve, extending somewhat from the outer surface of the box cover, is closed by means of a cap 23, which forms the outer end wall of the sleeve 22. In other parts the arrangement is quite like the one described in connection with Fig. 1 and works in the same manner.

According to Figs. 3 and 5 the sleeve 21, the flange provided thereon, and the cap 23 are similar to the ones described in connection with Fig. 2. The shaft 1 is provided with a threaded end and a capsular nut 24 is screwed thereupon. The bottom surface of said nut is provided with a diametrically extending slot 25 for receiving the one part of a cross-shaped member 26, the other part of which extends within a slot arranged at the inner end of a hollow pin 27 serving for the same purpose as the pins 4 and 19 described above. Thus said pin 27 is loose in relation to the shaft but is brought to rotate therewith on account of the cross piece 26. A spring 28 presses the hollow pin against the end of the shaft and conducting wires 29 are provided for forming an electric connection with the nut 24 and by means of the same with the shaft 1. In other particulars the modification according to Fig. 3 is close in conformity to the one shown and described in connection with Fig. 2.

Having now described my invention and the manner, in which the same is to be performed, I declare that what I claim is:—

1. An arrangement of the character described comprising a journal box, a shaft journalled therein, a ring-shaped and fixed contact member arranged around a part rotating with the shaft, said part forming a rotating contact member, a chamber surrounding both of the contact members and an electric conductive material, arranged within said chamber in constant contact with both of the contact members.

2. An arrangement of the character described comprising a journal box, a shaft journaled therein, a ring-shaped and fixed contact member arranged around a pin rotating with the shaft, a chamber surrounding both the fixed contact member and said pin, and an electric conductive material, arranged within said chamber in constant contact both with the rotating pin and the fixed contact member.

3. An arrangement of the character described comprising a journal box, a shaft end journalled therein, a pin arranged at the end of the shaft and rotating therewith, a fixed contact ring surrounding said pin and a housing surrounding both the pin and the fixed contact ring, a fixed flange provided around the inner end of said pin and a packing ring arranged between said flange and the said fixed contact ring, said latter ring being axially acted upon by a spring tending to press the same against the fixed flange and compressing the packing ring, an electric conductive material arranged within said housing so that it is in constant contact with both the fixed contact ring and the rotating pin.

4. An arrangement of the character described comprising a journal box, a shaft end journalled therein, a pin arranged at the end of the shaft and rotating therewith, a fixed contact ring surrounding said pin and a housing surrounding both the pin and the fixed contact ring, a fixed flange provided around the inner end of said pin, a packing ring arranged between said flange and the fixed contact ring, and means for compressing the packing ring between the flange and the fixed contact ring; an annular chamber arranged at the inner end of the journal box and surrounding the shaft, two ring shaped contact members arranged within said chamber, packing rings arranged outside of each of said members and means for pressing the ring-shaped contact members apart so as to compress the packing rings, an electric conductive material arranged within the housing at the outer end of the box and within the annular chamber arranged at the inner end of the same, so that said electric conductor is in constant contact with both the fixed contact rings and the parts rotating with the shaft.

In testimony whereof, I have signed my name to this specification in the presence of two subscribing witnesses.

HILDING KNUTSSON ÅNGSTRÖM.

Witnesses:
G. PETERSSON,
E. PERSON.